(12) United States Patent
Nelson et al.

(10) Patent No.: US 12,014,189 B2
(45) Date of Patent: Jun. 18, 2024

(54) REMOTE SYSTEM CONFIGURATION

(71) Applicant: Hewlett-Packard Development Company, L.P., Spring, TX (US)

(72) Inventors: Marvin Nelson, Boise, ID (US); Jennifer Lynn Melin, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 28 days.

(21) Appl. No.: 17/915,617

(22) PCT Filed: Jun. 15, 2020

(86) PCT No.: PCT/US2020/037717
§ 371 (c)(1),
(2) Date: Sep. 29, 2022

(87) PCT Pub. No.: WO2021/257050
PCT Pub. Date: Dec. 23, 2021

(65) Prior Publication Data
US 2023/0146124 A1    May 11, 2023

(51) Int. Cl.
*G06F 9/00* (2018.01)
*G06F 9/4401* (2018.01)
*G06F 9/445* (2018.01)

(52) U.S. Cl.
CPC ........ *G06F 9/44505* (2013.01); *G06F 9/4401* (2013.01)

(58) Field of Classification Search
CPC .............................. G06F 9/44505; G06F 9/4401
See application file for complete search history.

(56) References Cited

U.S. PATENT DOCUMENTS

| | | | |
|---|---|---|---|
| 7,188,161 B1 * | 3/2007 | O'Neil | H04L 41/0806 713/168 |
| 7,430,664 B2 * | 9/2008 | Zhu | H04L 67/06 713/168 |
| 10,382,268 B1 | 8/2019 | Meyer et al. | |
| 10,530,642 B1 | 1/2020 | Owens et al. | |
| 10,586,260 B2 * | 3/2020 | Alsina | G06Q 30/0601 |
| 10,587,451 B2 | 3/2020 | Gulati | |
| 2005/0202808 A1 | 9/2005 | Fishman et al. | |
| 2006/0174018 A1 | 8/2006 | Zhu et al. | |
| 2014/0025521 A1 | 1/2014 | Alsina et al. | |
| 2017/0339152 A1 | 11/2017 | Bower, III et al. | |

FOREIGN PATENT DOCUMENTS

WO    2006/043904 A1    4/2006
WO    2020/014633 A1    1/2020

* cited by examiner

*Primary Examiner* — Nitin C Patel
(74) *Attorney, Agent, or Firm* — Brooks, Cameron & Huebsch, PLLC (57) ABSTRACT

Systems and methods related to a remote configuration system are disclosed. The system includes a processing resource and a non-transitory machine-readable medium storing instructions executable by the processing resource to send an identification code to a server to initiate a system configuration, receive a payload including a configuration instruction responsive to the sent identification code, configure the system utilizing the payload including the configuration instruction, where the system is permanently configured, and store a receipt including the payload responsive to the configuration of the system.

15 Claims, 5 Drawing Sheets

REMOTE SYSTEM CONFIGURATION

BACKGROUND

Computing devices may be configured to perform task and functions by a manufacturing company. For instance, a manufacturing company may provide configuration instructions for a computing device and configure the computing device using the instructions.

DETAILED DESCRIPTION

Systems may be computer related devices configured to perform a specific task. The configuration of a system may be determined by a manufacturer to provide specific tasks and/or functions.

Some systems may be configured during manufacturing. For instance, some companies configure systems to preform specific task during the manufacturing of the system. Configuring a system before the system reaches the client may cause an increased system inventory and increased product shipment cost. In addition, some systems that allow for configuration after the client receives the system may allow for the system to be configured in ways that are not advantageous to the company that manufactured the system. For instance, the client may configure the system in a manner that does not coincide with the configurations paid for.

As such, systems, as described herein, may provide a secure configuration for a system based on the configuration predetermined by the manufacturer. For example, a system may comprise a processing resource to send an identification code to a server to initiate a system configuration, receive a payload including a configuration instruction, configure the system utilizing the payload including the configuration instruction, where the system is permanently configured, and store a receipt including the payload responsive to the configuration of the system. Notably, such systems may provide a remote configuration of the system based on predetermined configuration instruction. Remotely configuring a system based on predetermined configuration instruction may reduce the cost of the system and reduce the amount of system inventory produced by a company, as compared to systems configured during manufacturing and systems that allow for configurations that are not predetermined, for example.

Figure 1:
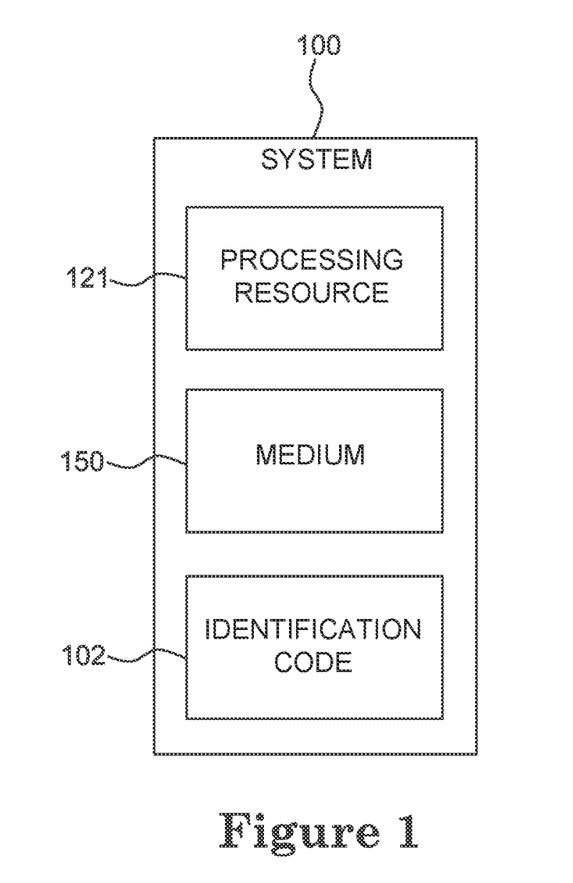
FIG. 1 illustrates an example of a system for remote system configuration.

FIG. 1 illustrates an example of a system 100 for remote system configuration. The system 100 may be a variety of computing related devices, such as desktop computers, portable computers, tablets, etc. In some examples, the system 100 may be a desktop or portable computing device. The system 100 may be configured to preform specific task and/or have specific abilities based on received configuration instructions. As used herein, a "configuration instruction" refers to information that is used to arrange components and/or functional units of a system. In some examples, the system 100 may be configured after the system 100 is received by a client. For example, a client may receive the system 100 and activate the system 100 to initiate the configuration of the system. That is, the system 100 may be remotely configured after the system 100 is manufactured. As used herein, "configuration" refers to the manner in which components and/or functional units of a system are arranged.

In some examples, a client may receive a system 100 and activate the system 100 to initiate a configuration process. Said differently, a client may initiate a remote configuration of the system 100 by starting the system 100 for the first time once it is received. In some examples, the system 100 may include a processing resource 121 and a non-transitory machine-readable medium 150 to process the remote configuration of the system 100. The non-transitory machine-readable medium 150 may store instructions that may allow the processing resource 121 to initiate the remote configuration of the system 100. The processing resource 121 may execute the instructions stored on the non-transitory machine-readable medium 150 to enable the system 100 to be remotely configured. The processing resource 121 and the non-transitory machine-readable medium 150 of the system 100 may allow for the permanent configuration of the system 100 after the system 100 has been manufactured and activated, which may reduce the cost of system production, prevent unwanted configurations of the system, and/or provide late configuration of the system 100, as compared to systems configured at manufacturing and/or systems that allow for configuration that are not predetermined, for example. As used herein, a "permanent configuration" refers to the manner in which components and/or functional units of a system are arranged that cannot be altered or changed after the system is configured.

In some examples, a system 100 may be manufactured based on default design. However, this disclosure is not so limited. In some examples, the system 100 may be manufactured based on a client specified design. The manufactured system 100 whether a default or specified design may not be configured during manufacturing process. In some examples, configuring the system 100 after the system is manufactured may reduce the cost of producing the system 100 and/or reduce the inventory of the system, as compared to configuring the system at manufacturing. For example, configuring the system 100 after manufacturing (e.g., after the system is received by the client) may allow a company to produce and/or store less systems. Configuration instructions may be sent to a server for later configuration of a system 100. As used herein, a "server" refers to a computer device and/or computer program that manages access to a resource and/or service in a network.

In some examples, a server may receive configuration instruction for a system 100. The configuration instructions may be sent to the server to be used to configure a specific system 100 identified by an identification code 102. The server may store system identification information to identify a system 100, based on an identification code 102, and match the system 100 to the configuration instruction. The configuration instructions may be used to remotely configure the system 100. As used herein, an "identification code" refers to information related to a specific system used to identify the specific system and confirm that information came from the specific system that is identified.

In some examples, the system 100 may be sent to a client after the system 100 is manufactured. The client may receive the system 100 in an unconfigured state. That is, the system 100 may be configured after the client receives the system. The client may initiate a remote configuration of the system 100 after the system 100 is received. The client may initiate the configuration of the system 100 by activating the system 100. Said differently, the client may start the system 100 to cause the system 100 to initiate a configuration of the system 100.

An unconfigured system 100 may initiate a configuration process once activated. The system 100 may include a processing resource 121 to initiate the configuration process for the system 100. The processing resource 121 may execute instructions stored on a non-transitory machine-readable medium 150 to cause the configuration of the system 100. For example, an identification code 102 may be stored on the system 100. The identification code 102 may provide information that identifies the system 100 and identifies configuration instructions design specifically for the system 100. The identification code 102 may be sent to a server, by the processing resource 121, to identify the system 100 to the server and initiate the configuration process.

The server may receive an identification code 102 from the processing resource 121. The server may identify the system 100 from the identification code 102 and determine the configuration instruction for the identified system 100. The configuration instructions may be instructions that cause a processing resource 121 to permanently configure the system 100. The server may use the identification code 102 to generate a payload that includes configuration instructions for the identified system 100. The payload may include information that allows the system 100 to configure once when in an unconfigured mode. As used herein, a "payload" refers to information related to a configuration instruction and a system that is used to configure the system. For example, the payload may include information, such as, system identification, system model type, configuration instructions, a signature, and/or a receipt. The payload may assist the system 100 in the configuration process. The server may send the payload to the system 100 and the processing resource 121 of the system 100 may use the information provided in the payload to cause the configuration of the system 100.

For instance, the processing resource 121 may receive the payload from the server and determine the content of the payload. The processing resource 121 may use the configuration instruction provided in the payload to permanently configure the system 100. The configuration bits of the system 100 may be set to fuse bits. The processing resource 121 may configure the system 100 using the fuse bits to permanently configure the system 100. Configuring the system 100 using fuse bits may prevent the system 100 from being re-configured after the configuration process is complete. As used herein, "configuration bits" refers to settings to configure and control the operation of a system. As used herein, "fuse bits" refers to settings to configure and control the operation of a system that can be written once.

In some examples, the processing resource 121 of the system 100 may generate a receipt. The receipt may include information from the payload and information related to the configuration of the system. The receipt may document the contents of the system 100 and may be used to confirm that the system configuration is unaltered after the configuration of the system is complete. As used herein, a "receipt" refers to a documentation of the originally configured system components and/or a documentation of the system components based on the configuration instruction. In some examples, a receipt may include a system identification, a payload, system information, a signature, and/or cryptographic information, etc. As used herein, "cryptographic information" refers to information that is not readable and/or unable to be deciphered without a code and/or key used to decrypt the information. The components of the receipt may be compared to the components of the system configuration to determine if the configuration of the system 100 has been altered.

For example, the receipt may store information related to the configuration of the system 100 immediately after configuration and compare the information to the currently configured system 100. As used herein, "immediately" refers to a time frame that is substantially instantaneous after a preceding event. As used herein, the term "substantially" intends that the characteristic does not have to be absolute but is close enough so as to achieve the characteristic. For example, "substantially instantaneous" is not limited to absolutely instantaneous. If the currently configured system includes elements that are not present in the receipt, then the system configuration has been altered. Similarly, if the currently configured system includes less elements than the receipt, then the system configuration may have been altered. However, if the currently configured system includes the same elements that are on the receipt, then the system configuration may be unaltered. In some examples, the system 100 may be disabled if the system configuration is determined to be altered. That is, the system 100 may no longer be able to function once it is determined that the system configuration has been altered. Comparing the receipt to the currently configured system 100 may ensure that the system configuration is unaltered and/or prevent a system 100 with an altered configuration from being used when the system 100 is remotely configured.

Figure 2:
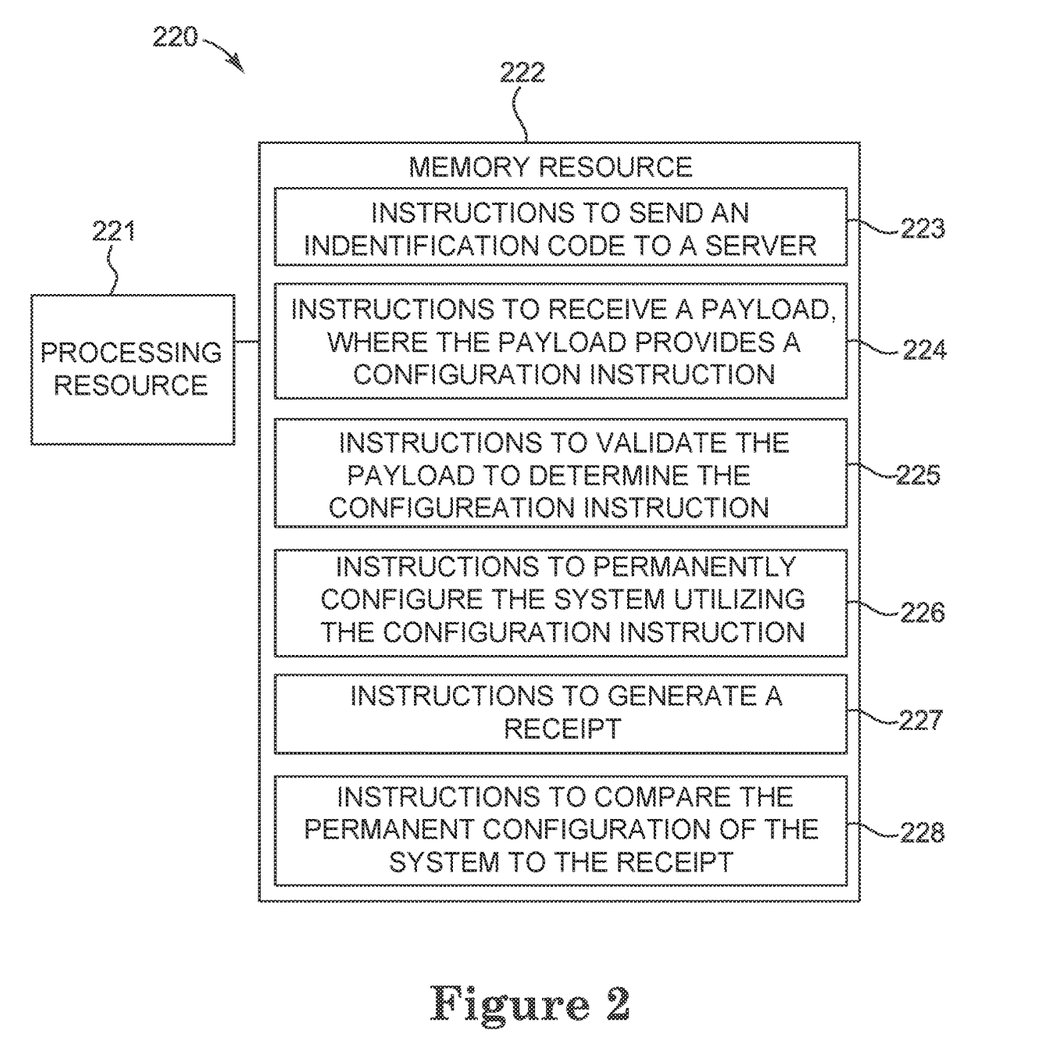
FIG. 2 illustrates an example of an apparatus suitable with a system for remote system configuration.

FIG. 2 illustrates an example of an apparatus 220 suitable with a system for remote system configuration. As illustrated in FIG. 2, the apparatus 220 includes a processing resource 221 and a memory resource 222. The processing resource 221 is a hardware processing device such as a microprocessor, application specific instruction set processor, coprocessor, network processor, or similar hardware circuitry that causes machine-readable instructions to be executed. In some examples, the processing resource 221 may be a plurality of hardware processing devices that may cause machine-readable instructions to be executed. The processing resource 221 may include central processing devices (CPUs) among other types of processing devices. The processing resource 221 may also include dedicated circuits and/or state machines, such as in an Application Specific Integrated Circuit (ASIC), Field Programmable Gate Array (FPGA) or similar design-specific hardware. The memory resource 222 may be any type of volatile or non-volatile non-transitory memory, such as random-access memory (RAM), flash memory, read-only memory (ROM), storage volumes, a hard disk, or a combination thereof.

The memory resource 222 may store instructions thereon, such as instructions 223, 224, 225, 226, 227, and 228. When executed by the processing resource 221, the instructions may cause the apparatus 220 to perform specific tasks and/or functions. For example, the memory resource 222 may store instructions 223, that when executed by the processing resource 221, cause the processing resource 221 to send an identification code to a server. A system (e.g., system 100 of FIG. 1) may include a processing resource 221 and a memory resource 222. The processing resource 221 may initiate a configuration process by sending an identification code to a server. A system may not be able to function without being properly configured with configuration instructions from a payload. That is, a client may not be able to use a system in an unconfigured state. The client may have to initiate a configuration process to use the system. A client may begin the configuration process of a system by activating the system. When an unconfigured system is activated the system may communicate with a server to begin the configuration process and configure the system. That is, the processing resource 221 of the system may send an identification code to the server. The identification code may provide the server with the identity of the system. Said differently, the identification code may be a code to identify the specific system and confirm that the information received by the server came from the specific system. In some examples, the identification code may include a request for configuration instructions. The configuration instructions may be used to remotely configure the system.

The memory resource 222 may store instructions 224, that when executed by the processing resource 221, cause the processing resource 221 to receive a payload, where the payload provides a configuration instruction. In some examples, the payload may include information used to configure a system. A server may receive information to generate a payload before, during, and/or after the manufacturing of a system. The information may be related to the configuration of a system. For example, the server may receive information, such as system identification information, system model type information, system configuration information, and/or a private/public key for signatures, amongst other possibilities. However, this disclosure is not so limited. As described in detail herein, the payload may include a signed receipt. The receipt may be signed with a private key. The server may use the received information to generate a payload for a specified system. The payload may provide an identified system with instructions on how to configure an unconfigured system when received by a system.

A server may receive an identification code from a system requesting configuration instruction from the server. The server may determine the identity of the system based on the identification code and match the identified system to the generated payload for the system. When the server matches the system to the payload, the server may send the payload to the system. The processing resource 221 of the system may receive the payload and used the payload to complete the configuration of the system.

The memory resource 222 may store instructions 225, that when executed by the processing resource 221, cause the processing resource 221 to validate the payload to determine the configuration instruction. The processing resource 221 of a system may receive a payload from a server to assist in the configuration process. As described herein, the payload may include multiple components related to the system and the configuration of the system. The processing resource 221 may validate the payload by analyzing the payload to determine each component of the payload. For instance, the processing resource 221 may determine the system model type by validating the payload. Likewise, the processing resource 221 may determine the configuration instruction by validating the payload, etc. The processing resource 221 may then use the configuration instruction to configure the system.

The memory resource 222 may store instructions 226, that when executed by the processing resource 221, cause the processing resource 221 to permanently configure the system utilizing the configuration instruction. A system may be manufactured and sent to a client in an unconfigured state.

In some examples, sending a system to a client in an unconfigured state may allow for the remote configuration of the system after manufacturing. During manufacturing the configuration bits are cleared and set to fuse bits. Setting the configuration bits to clear may leave the system in an unconfigured state. Further, setting the configuration to fuse bits may prevent the system from being re-configured after the configuration is complete.

The processing resource 221 of the system may use the configuration instruction provided by the payload to write the system configuration on the fuse bits. Once the system configuration is written on the fuse bits and the system configuration is complete, the fuse bits may not be altered. Said differently, the system may be permanently configured, and the system may be set to a configuration complete mode.

The memory resource 222 may store instructions 227, that when executed by the processing resource 221, cause the processing resource 221 to generate a receipt. In some examples, the processing resource 221 may generate a receipt when the system is set to a configuration complete mode. The receipt may be used to document the configuration of the system immediately after the system is set to configuration complete. Said differently, the receipt may be used to confirm that the configuration of the system matches the configuration instruction provided by the payload. That is, the system may be configured based on the configuration instructions provided in the payload. As such, the configuration of the system immediately after the system is set to configuration complete should be the same as the configuration instruction. The receipt may document the unaltered configuration of the system.

In some examples, the receipt may be generated by the processing resource 221 of the system using, for example, the system identification, the system configuration, the payload including the configuration instruction, system information, a signature, and/or cryptographic information, among other possibilities. The receipt may be generated on the system using cryptographic information and the payload. That is, the content of the receipt may be encrypted.

The memory resource 222 may store instructions 228, that when executed by the processing resource 221, cause the processing resource 221 to compare the permanent configuration of the system to the receipt. The processing resource 221 may perform periodic checks to determine if the system configuration has been altered. As used herein, "periodic" refers to a time frame that occurs at set intervals. For example, the processing resource 221 may perform a check each time the system is activated, after the system is activated threshold number of times, once a week, and/or once a month, etc. The processing resource 221 may perform the periodic checks by comparing a valid receipt to the permanent configuration of the system. In some examples, the receipt may not be valid if the receipt is not signed. As described herein, the receipt may be signed by the server with a private key and may contain cryptographic information.

In some examples, the receipt may be a documentation of the system immediately after the system is set to a configuration complete mode. If the current configuration of the system does not match the receipt, then the processing resource 221 may determine that the system configuration has been altered. If it is determined that the system configuration has been altered, the system may be disabled. That is, the processing resource 221 may disable the system so that the system can no longer function for its intended purpose. In contrast, if the current configuration of the system does match the receipt, then the processing resource 221 may determine that the system configuration is unaltered, and the system may continue to function as normal.

Figure 3:
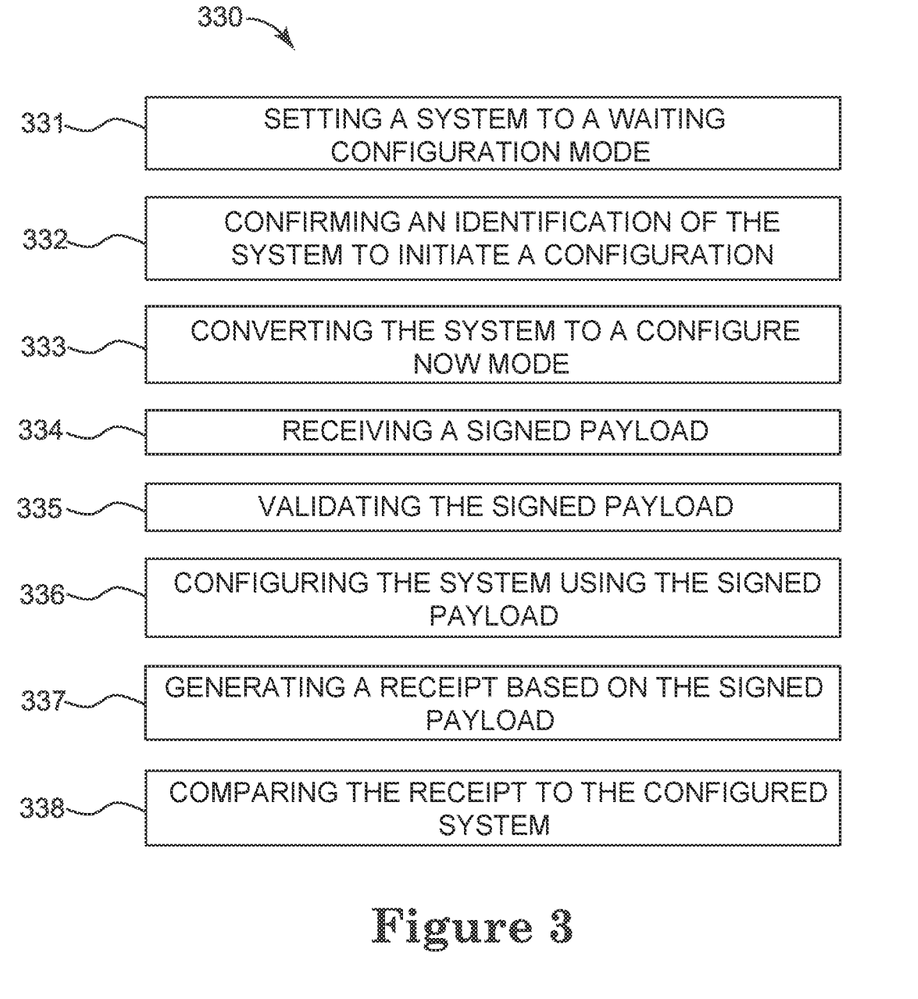
FIG. 3 illustrates an example of a method for remote system configuration.

FIG. 3 illustrates an example of a method 330 for remote system configuration. Method 330 may be performed, for example, by a processor resource (e.g., processor resource 221 of FIG. 2) of an apparatus (e.g., apparatus 220 of FIG. 2). The method 330 may be performed with more or less elements.

At 331, the method 330 may include setting a system to a waiting configuration mode. A system (e.g., system 100 of FIG. 1) may be manufactured and set to a waiting configuration mode. Setting the system to a waiting configuration mode may allow the system to finish manufacturing without being configured. The waiting configuration mode may allow the system to be configured at a later point in time (e.g., the system may be configured after the system is received by a client). For example, the system may begin a configuration process the first time the system is activated. Placing the system in a waiting configuration mode may set the configuration bits to fuse bits and leave the system in an unconfigured state.

At 332, the method 330 may include confirming an identification of the system to initiate a configuration. An unconfigured system may send an identification code to a server, when activated, to initiate a configuration process. The identification code may include information that may allow the server to confirm the identity of the system. That is, the system may confirm the identity of the system to a server by sending the identification code to the server.

At 333, the method 330 may include converting the system to a configure now mode. The system may be placed in a waiting configuration mode before being sent to a client. The client may activate the system to initiate a configuration process. When the configuration process is initiated the processing resource may change the mode of the system and send an identification code to the server. For example, a processing resource may convert the system from a waiting configuration mode to a configure now mode. Converting the system into a configure now mode may allow the system to configure the system with received configuration instruction.

At 334, the method 330 may include receiving a signed payload. The payload may be signed with a private key. In some examples, the system may receive a signed payload from a server after a request for configuration instruction by the system. For example, the processing resource of the system may send an identification code to the server. The identification code may be a request for configuration instruction. In addition, the identification code may include information to identify the system. The server may process the configuration instruction request and send a signed payload including configuration instruction to the processing resource. The processing resource may use the signed payload to configure the system when in a configure now mode. In some examples, the processing resource of the system may not accept a payload that is not signed with a private key. That is, the payload may not be an authorized payload if it is not signed with a private key. Said differently, the processing resource may not be able to configure the system if the payload is not properly signed with a private key At 335, the method 330 may include validating the signed payload. The processing resource of the system may receive a signed payload from a server. The signed payload may include a plurality of information. For example, the signed payload may include the identity of the system, the model type of the system, a privately signed receipt, a signature, configuration instruction, or combinations thereof. The system may analyze the signed payload to determine the contents of the signed payload. Said differently, the processing resource may validate the payload to determine the configuration instruction to configure the system.

At 336, the method 330 may include configuring the system using the signed payload. The processing resource of the system may use the configuration instruction provided by the signed payload to configure the system. The system may be configured remotely while in the possession of the client. That is, the system may use the fuse bits included in the system to permanently configure the system. Once the system is permanently configured, the system may convert the system to a configuration complete mode and generate a receipt to document the configuration of the system. For instance, the method 330, at 337, may include generating a receipt based on the signed payload. As described herein, the receipt may be generated to ensure the system configuration remains unaltered. The processing resource may generate the receipt when the system converts to a configuration complete mode. The receipt may document the structure of the system immediately after the system converts to a configuration complete mode to determine when the system configuration is altered. The receipt may determine if the system configuration has been altered by comparing the components of the receipt to the components of the system after the receipt is generated.

At 338, the method 330 may include comparing the receipt to the configured system. As described herein, the processing resource may periodically compare the receipt to the current system configuration. Comparing the current system configuration to the receipt may determine if the system configuration is altered after the system is placed in a configuration complete mode. If the system configuration is unaltered, a client may be able to continue to use the system. However, if the system configuration is altered, then the system may be disabled, and the client may no longer be able to use the system. In some examples, the components of the receipt may be compared to the current components of the system. If the current components of the system and the components of the receipt match, then it may be determined that the system has been altered. In some examples, the processing resource may compare the order of the components in the receipt to the order of the current components of the system. If the order of the current components of the system and the order of the components in the receipt do not match, then it may be determined that the system has been altered. For example, if the order of the system components does not exactly match the order of the receipt components, then the processing resource may determine that the system configuration has been altered. In contrast, if the order of the system components does exactly match the order of the receipt components, then the processing resource may determine that the system configuration has not been altered.

Figure 4:
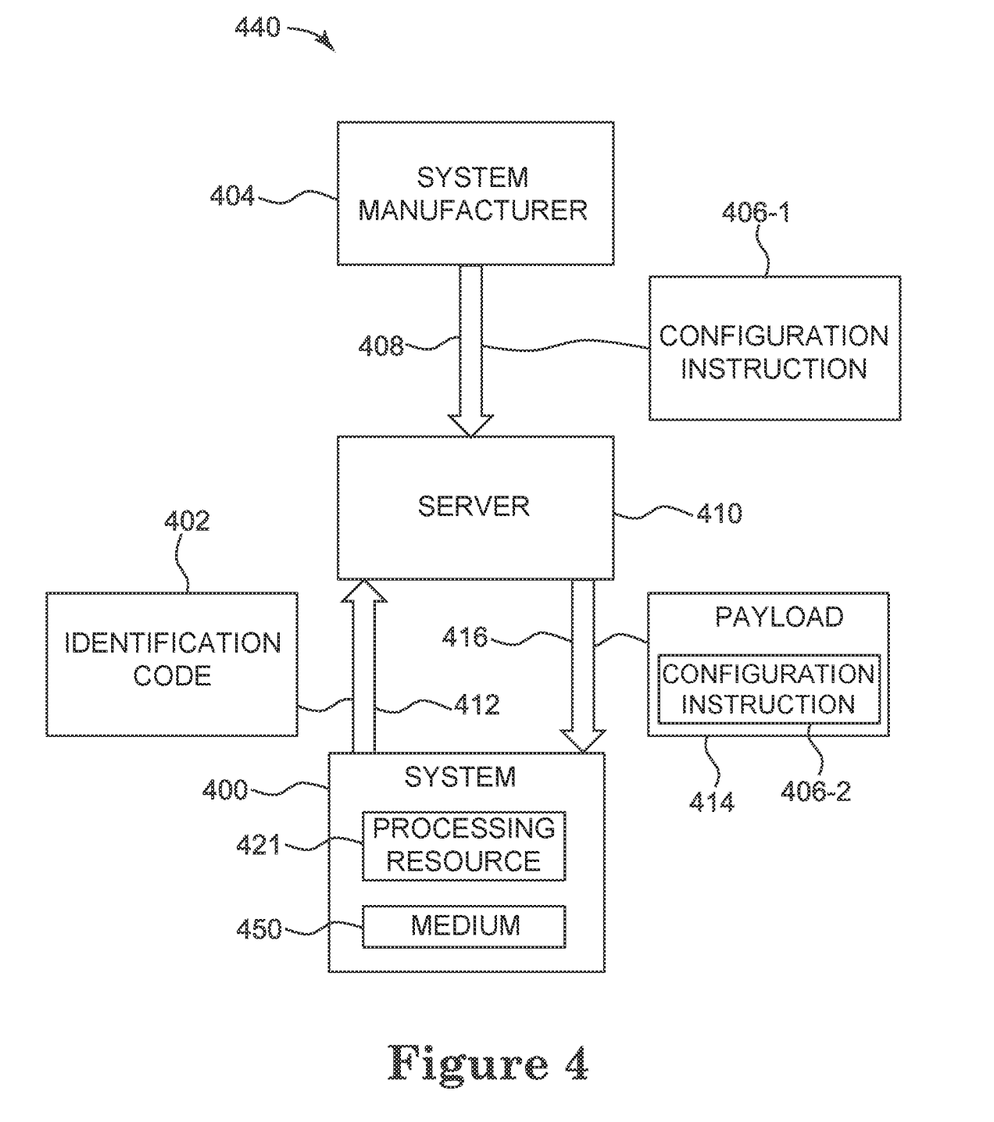
FIG. 4 illustrates an example of a flow diagram including a system for remote system configuration.

FIG. 4 illustrates an example of a flow diagram 440 including a system 400 for remote system configuration. FIG. 4 may include analogous or similar elements as FIG. 1. For example, FIG. 4 may include a system 400, a processing resource 421, a medium 450, and an identification code 402.

In some examples, a system 400 may include a processing resource 421, a medium, and an identification code 402 stored on the system 400. The system 400 may allow remote configuration of the system 400 after the system 400 has been manufactured. As described herein, the system may be manufactured and set to a waiting configuration mode for a later configuration (e.g., the system may be configured at the first activation of the system) by a system manufacturer 404. Before, during, and/or after the system 400 is manufactured by the system manufacturer 404, configuration instruction 406-1 may be sent to the server 410, through a communication path 408, by the system manufacturer 404. It should be understood that the arrows illustrated in FIG. 4 are used to represent one element communicating with another element. In addition, other information that may be used to remotely configure a system 400 may be sent to the server 410 during by the system manufacturer 404, before, and/or after the system 400 is manufactured, through communication 408. As used herein, a "system manufacturer" refers to a company, entity, and/or person that produces the system. As used herein, a "system manufacturing" refers to the act of producing, creating, and/or developing a system.

For example, the system identification information, and/or system model information, etc. may be sent to the server by the system manufacturer 404 during, before, and/or after the system 400 is manufactured by the system manufacturer 404. The server 410 may receive the configuration instruction 406-1 and related information and store the configuration instruction 406-1 and related information. The server 410 may utilized the stored information to generate a signed payload 414. The signed payload 414 may be sent to a system 400 by the server 410, through a communication path 416 (e.g., wireless communication, wired communication, bus, etc.), to configure the system 400.

As described herein, the system 400 may include a medium 450 to store instructions that are executed by the processing resource 421 to configure the system 400. For example, the processing resource 421 may send an identification code 402 to the server 410, through a communication path 412. The identification code 402 may provide information to the server 410 that allows the server 410 to identify the system 400. The server 410 may determine that the system 400 is an authorized device through the identification code 402 received through a communication path 412. Once the server 410 determines that the system 400 is an authorized device, the server 410 may send the generated signed payload 414 including a configuration instruction 406-2 to the system 400, through a communication path 416.

As described herein, the processing resource 421 of the system 400 may utilize the configuration instruction 406-2 provided by the signed payload 414 to permanently configure the system 400. The system 400 may not function until the system 400 is configured. In some examples, the processing resource 421 may not configure the system 400 with the configuration instruction 406-2 unless the payload 414 is signed by the server 410. As described herein, the server 410 may sign the payload 414 with a private key to provide secure configuration instruction to configure the system 400.

The processing resource 421 of the system 400 may generate a receipt to document the configuration of the system 400 and store the receipt on the processing resource 421 of the system 400. The receipt may be compared to the system 400 periodically after the receipt is generated to ensure the system 400 configuration is unaltered.

Figure 5:
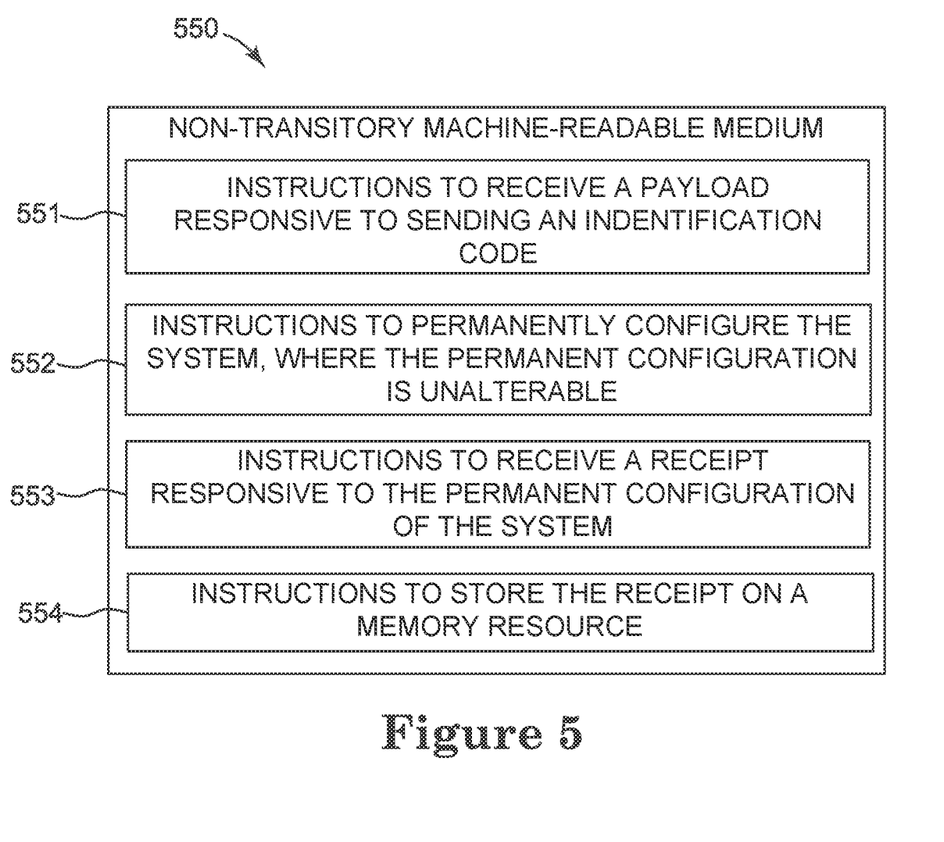
FIG. 5 illustrates an example diagram of a non-transitory machine-readable medium suitable with a system for remote system configuration.

FIG. 5 illustrates an example diagram of a non-transitory machine-readable medium 550 suitable with a system for remote system configuration. The non-transitory machine-readable medium 550 may be any type of volatile or non-volatile non-transitory memory, such as random-access memory (RAM), flash memory, read-only memory (ROM), storage volumes, a hard disk, or a combination thereof.

The medium 550 stores instruction 551 executable by a processing resource to receive a payload responsive to sending an identification code. In various examples, the processing resource may execute transfer instructions 551 to send an identification code to a server. The processing resource may send the identification code to the server to request information that may be used to configure the system. The processing resource may receive a payload including information related to configuring the system from a server in response to the sent identification code. In some examples, the identification code may be a transaction specific identifier. Said differently, each identification code sent by the processing resource may be unique from other identification codes sent by the same system and/or other systems. The server may receive the identification code and generate a payload based on the identification code for the current transaction. The server generating a payload based on the sent identification code may create a payload that uniquely matches the identification code. That is, the generated payload may not match any other identification code and may not be an authorized payload if it does not match the sent identification code.

The medium 550 stores instruction 552 executable by a processing resource to permanently configure the system, where the permanent configuration is unalterable. The processing resource may execute configure instructions to configure the system. As described herein, the processing resource may configure the system using configure instruction provided in the payload sent by the server. Said differently, the processing resource may set the fuse bits based on the configuration instruction provided in the payload to permanently configure the system. In some examples, once the system is configured, the system may not be re-configured. That is, the fuse bits may prevent the system from being re-configured after the configuration process is complete. The system may enter a configuration complete mode when the configuration is complete to prevent further configuration of the system and generate and/or produce a receipt.

The medium 550 stores instruction 553 executable by a processing resource to receive a receipt responsive to the permanent configuration of the system. In various examples, the processing resource may execute retrieve instructions 553 to receive a receipt from a server. In some examples, the server may send a receipt signed with a private key to the processing resource of the system. For example, the server may include a receipt signed with a private key to the system through the payload. The processing resource may configure the system using the configuration instruction provided by the payload. In some examples, the server may send the receipt signed with the private key to the processing resource after the system is set to a configuration complete mode. For example, the processing resource may send a notification to the server notifying the server that the system is in a configuration complete mode. The server may determine the identity of the system and send a receipt signed with a private key. The system may store the receipt signed with the private key on the memory resource responsive to receiving the receipt from the server.

The medium 550 stores instruction 554 executable by a processing resource to store the receipt on a memory resource. In various examples, the processing resource may execute store instructions 554 to store a signed receipt. The signed receipt stored on the memory resource of the system may be used to compare a current version of the system configuration to the version of the system configuration documented on the signed receipt. Comparing the current version of the system configuration to the version of the system configuration documented on the signed receipt may identify any changes to the system after the signed receipt was stored on the system. If processing resource determines that the system configuration has been altered, based on the comparison of the current version of the system configuration and the version of the system configuration documented on the signed receipt then the processing resource may disable the system.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 402 in FIG. 4.

Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

The above specification and examples provide a description of the method and applications and use of the system and method of the present disclosure. Since many examples can be made without departing from the scope of the system and method, this specification merely sets forth some of the many possible example configurations and implementations.

It should be understood that the descriptions of various examples may not be drawn to scale and thus, the descriptions may have a different size and/or configuration other than as shown therein.

What is claimed:

1. A system comprising:
a processing resource; and
a non-transitory machine-readable medium storing instructions executable by the processing resource to:
send an identification code to a server to initiate a system configuration;
receive a payload including a configuration instruction responsive to the sent identification code;
configure the system utilizing the payload including the configuration instruction, wherein the system is permanently configured;
store a receipt including the payload responsive to the configuration of the system; wherein the receipt is documentation of the originally configured system components and/or a documentation of the system components based on the configuration instruction; and
compare the permanent configuration of the system to the receipt responsive to a booting of the system.

2. The system of claim 1, further comprising instructions to compare receipt components to system configuration to determine if the system has been altered.

3. The system of claim 2, further comprising instructions to compare the receipt components and system components by comparing an order of the receipt components to an order of the system components.

4. The system of claim 1, further comprising instructions to validate the payload prior to configuring the system.

5. The system of claim 1, wherein the receipt includes a system identification, the payload, system information, a signature, cryptographic information, or combinations thereof.

6. The system of claim 1, wherein the identification code is a one-time use identification code that is different from other identification codes and identifies the system.

7. The system of claim 1, wherein the payload is received from the server responsive to the identification of the system by the server.

8. A non-transitory machine-readable medium storing instructions executable by a processing resource to:
send an identification code to a server prior to initiating a system configuration;
receive a payload, from the server, responsive to sending the identification code, wherein the payload provides a configuration instruction;
validate the payload to determine the configuration instruction;
permanently configure the system utilizing the configuration instruction provided in the payload responsive to the validation of the payload, wherein the permanent configuration is unalterable;
generate a receipt responsive to the permanent configuration of the system; wherein the receipt is documentation of the originally configured system components and/or a documentation of the system components based on the configuration instruction; and
compare the permanent configuration of the system to the receipt responsive to a booting of the system.

9. The non-transitory machine-readable medium of claim 8, further including instructions to store the receipt on a memory resource.

10. The non-transitory machine-readable medium of claim 8, wherein the receipt is signed by the server with a private key.

11. The non-transitory machine-readable medium of claim 8, wherein the payload is generated based on the identification code.

12. A method comprising:
setting a system to a waiting configuration mode;
confirming an identification of the system to a server to initiate configuration of the system;
converting the system from the waiting configuration mode to a configure now mode responsive to the confirmed identification of the system;
receiving a signed payload from the server responsive to the confirmed identification of the system;
validating the signed payload to determine a configuration instruction;
configuring the system using the signed payload including the configuration instruction;
generating a receipt based on the signed payload, wherein the receipt is stored on the system; wherein the receipt is documentation of the originally configured system components and/or a documentation of the system components based on the configuration instruction; and
comparing the receipt to the configured system to determine if a configuration of the system has been altered.

13. The method of claim 12, further comprising disabling the system responsive to a determination that the system has been altered.

14. The method of claim 12, further comprising sending the receipt to the server responsive to generating the receipt.

15. The method of claim 12, further comprising comparing the receipt to the configured system each time the system is activated.

* * * * *